(12) United States Patent
Lee et al.

(10) Patent No.: US 12,323,971 B2
(45) Date of Patent: Jun. 3, 2025

(54) DEVICE OF HANDLING PUSCH TRANSMISSIONS

(71) Applicant: ACER INCORPORATED, New Taipei (TW)

(72) Inventors: Chien-Min Lee, New Taipei (TW); Jen-Hsien Chen, New Taipei (TW); Li-Chung Lo, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 457 days.

(21) Appl. No.: 17/846,036

(22) Filed: Jun. 22, 2022

(65) Prior Publication Data

US 2023/0008498 A1 Jan. 12, 2023

Related U.S. Application Data

(60) Provisional application No. 63/218,509, filed on Jul. 6, 2021.

(51) Int. Cl.
*H04W 72/1268* (2023.01)
*H04W 72/23* (2023.01)

(52) U.S. Cl.
CPC ....... *H04W 72/1268* (2013.01); *H04W 72/23* (2023.01)

(58) Field of Classification Search
CPC .......................... H04W 72/1268; H04W 72/23
See application file for complete search history.

(56) References Cited

U.S. PATENT DOCUMENTS

| 2019/0053211 | A1* | 2/2019 | Ying | H04W 72/044 |
| 2020/0313793 | A1 | 10/2020 | Jung | |
| 2021/0045110 | A1 | 2/2021 | Fröberg Olsson | |
| 2021/0067950 | A1 | 3/2021 | Hosseini | |
| 2021/0091890 | A1 | 3/2021 | Ren | |
| 2021/0168783 | A1 | 6/2021 | Islam | |
| 2022/0159683 | A1* | 5/2022 | Islam | H04W 72/1268 |
| 2022/0224456 | A1* | 7/2022 | Yi | H04W 72/1268 |

(Continued)

FOREIGN PATENT DOCUMENTS

| JP | 2020-167568 A | 10/2020 |
| JP | 2020-530214 A | 10/2020 |
| WO | 2019/016952 A1 | 1/2019 |

OTHER PUBLICATIONS

Machine English Translation of KR 10-2021-0063025 (Year: 2021).*
(Continued)

*Primary Examiner* — James P Duffy
(74) *Attorney, Agent, or Firm* — Winston Hsu

(57) ABSTRACT

A communication device for handling physical uplink (UL) shared channel (PUSCH) transmissions, comprises at least one storage device; and at least one processing circuit, coupled to the at least one storage device, wherein the at least one storage device stores instructions, and the at least one processing circuit is configured to execute the instructions of receiving an indicator indicating a plurality of physical uplink (UL) shared channel (PUSCH) repetitions from a network; determining at least one nominal transmission duration for the plurality of PUSCH repetitions; and transmitting the plurality of PUSCH repetitions to the network in the at least one nominal transmission duration according to the indication.

22 Claims, 6 Drawing Sheets

(56) References Cited

U.S. PATENT DOCUMENTS

2023/0291523 A1* 9/2023 Hasegawa ............. H04L 5/0094
2024/0333428 A1* 10/2024 Yamamoto ............ H04W 28/06

OTHER PUBLICATIONS

Moderator (China Telecom), [104-e-NR-CovEnh-03] Summary of email discussion on joint channel estimation for PUSCH, 3GPP TSG RAN WG1 Meeting #104-e, R1-2102161, E-Meeting, Jan. 25-Feb. 5, 2021.
3GPP TS 38.214 V16.6.0 (Jun. 2021); 3rd Generation Partnership Project; Technical Specification Group Radio Access Network; NR; Physical layer procedures for data (Release 16), pp. 1-171, 2021/06.

* cited by examiner

DEVICE OF HANDLING PUSCH TRANSMISSIONS

CROSS REFERENCE TO RELATED APPLICATIONS

This application claims the benefit of U.S. Provisional Application No. 63/218,509, filed on Jul. 6, 2021. The content of the application is incorporated herein by reference.

BACKGROUND OF THE INVENTION

1. Field of the Invention

The present invention relates to a device used in a wireless communication system, and more particularly, to a device of handling physical uplink shared channel (PUSCH) transmissions.

2. Description of the Prior Art

A long-term evolution (LTE) system supporting the 3rd Generation Partnership Project (3GPP) Rel-8 standard and/or the 3GPP Rel-9 standard are developed by the 3GPP as a successor of the universal mobile telecommunication system (UMTS) for further enhancing performance of the UMTS to satisfy increasing needs of users. The LTE system includes a new radio interface and a new radio network architecture that provides high data rate, low latency, packet optimization, and improved system capacity and coverage.

A LTE-advanced (LTE-A) system, as its name implies, is an evolution of the LTE system. The LTE-A system targets faster switching between power states, improves performance at the coverage edge of an evolved Node-B (eNB), increases peak data rate and throughput, and includes advanced techniques, such as carrier aggregation (CA), coordinated multipoint (CoMP) transmissions/reception, uplink (UL) multiple-input multiple-output (UL-MIMO), licensed-assisted access (LAA) (e.g., using LTE), etc.

A next generation radio access network (NG-RAN) is developed for further enhancing the LTE-A system. The NG-RAN includes one or more next generation Node-Bs (gNBs), and has properties of wider operation bands, different numerologies for different frequency ranges, massive MIMO, advanced channel codings, etc.

It is difficult for the UE perform UL transmissions to the gNB efficiently due to limited UL resources. Various procedures have been designed in different versions of the 3GPP standard to improve the efficiency of the UL transmissions. Multiple time durations are proposed in the present invention to provide a new architecture for the UL transmissions to further improve the efficiency.

SUMMARY OF THE INVENTION

The present invention therefore provides a device for handling physical uplink (UL) shared channel (PUSCH) transmissions to solve the abovementioned problem.

A communication device for handling physical uplink (UL) shared channel (PUSCH) transmissions, comprises at least one storage device; and at least one processing circuit, coupled to the at least one storage device, wherein the at least one storage device stores instructions, and the at least one processing circuit is configured to execute the instructions of receiving an indicator indicating a plurality of physical uplink (UL) shared channel (PUSCH) repetitions from a network; determining at least one nominal transmission duration for the plurality of PUSCH repetitions; and transmitting the plurality of PUSCH repetitions to the network in the at least one nominal transmission duration according to the indication.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
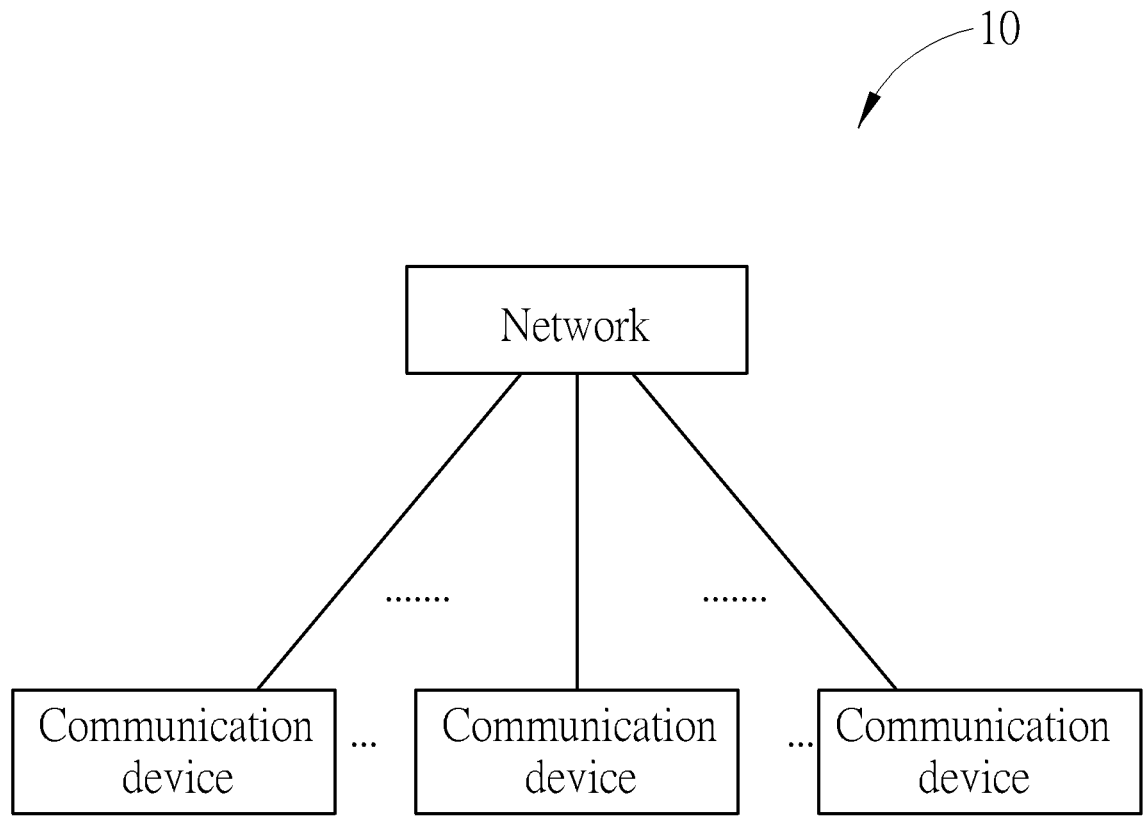
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network and a plurality of communication devices. The wireless communication system 10 may support a time-division duplexing (TDD) mode, a frequency-division duplexing (FDD) mode, a TDD-FDD joint operation mode, a non-terrestrial network (NTN) mode or a licensed-assisted access (LAA) mode. That is, the network and a communication device may communicate with each other via FDD carrier(s), TDD carrier(s), licensed carrier(s) (licensed serving cell(s)) and/or unlicensed carrier(s) (unlicensed serving cell(s)). In addition, the wireless communication system 10 may support a carrier aggregation (CA). That is, the network and a communication device may communicate with each other via multiple serving cells (e.g., multiple serving carriers) including a primary cell (e.g., primary component carrier) and one or more secondary cells (e.g., secondary component carriers).

In FIG. 1, the network and the communication devices are simply utilized for illustrating the structure of the wireless communication system 10. Practically, the network may be a universal terrestrial radio access network (UTRAN) including at least one Node-B (NB) in a universal mobile telecommunications system (UMTS).

In one example, the network may be an evolved UTRAN (E-UTRAN) including at least one evolved NB (eNB) and/or at least one relay node in a long term evolution (LTE) system, a LTE-Advanced (LTE-A) system, an evolution of the LTE-A system, etc. In one example, the network may be a next generation radio access network (NG-RAN) including at least one next generation Node-B (gNB) and/or at least one fifth generation (5G) base station (BS). In one example, the network may be any BS conforming to a specific communication standard to communicate with a communication device.

A NR is a standard defined for a 5G system (or 5G network) to provide a unified air interface with better performance. gNBs are deployed to realize the 5G system, which supports advanced features such as enhanced Mobile Broadband (eMBB), Ultra Reliable Low Latency Communications (URLLC), massive Machine Type Communications (mMTC), etc. The eMBB provides broadband services with a greater bandwidth and a low/moderate latency. The URLLC provides applications (e.g., end-to-end communication) with properties of a higher reliability and a low latency. The examples of the applications include an industrial internet, smart grids, infrastructure protection, remote surgery and an intelligent transportation system (ITS). The mMTC is able to support internet-of-things (IoT) of the 5G system which include billions of connected devices and/or sensors.

Furthermore, the network may also include at least one of the UTRAN/E-UTRAN/NG-RAN and a core network, wherein the core network may include network entities such as Mobility Management Entity (MME), Serving Gateway (S-GW), Packet Data Network (PDN) Gateway (P-GW), Self-Organizing Networks (SON) server and/or Radio Network Controller (RNC), etc. In one example, after the network receives information transmitted by a communication device, the information may be processed only by the UTRAN/E-UTRAN/NG-RAN and decisions corresponding to the information are made at the UTRAN/E-UTRAN/NG-RAN. In one example, the UTRAN/E-UTRAN/NG-RAN may forward the information to the core network, and the decisions corresponding to the information are made at the core network after the core network processes the information. In one example, the information may be processed by both the UTRAN/E-UTRAN/NG-RAN and the core network, and the decisions are made after coordination and/or cooperation are performed by the UTRAN/E-UTRAN/NG-RAN and the core network.

A communication device may be a user equipment (UE), a low cost device (e.g., machine type communication (MTC) device), a device-to-device (D2D) communication device, a narrow-band internet of things (IoT) (NB-IoT), a mobile phone, a laptop, a tablet computer, an electronic book, a portable computer system, or combination thereof. In addition, the network and the communication device can be seen as a transmitter or a receiver according to direction (i.e., transmission direction), e.g., for an uplink (UL), the communication device is the transmitter and the network is the receiver, and for a downlink (DL), the network is the transmitter and the communication device is the receiver.

Figure 2:
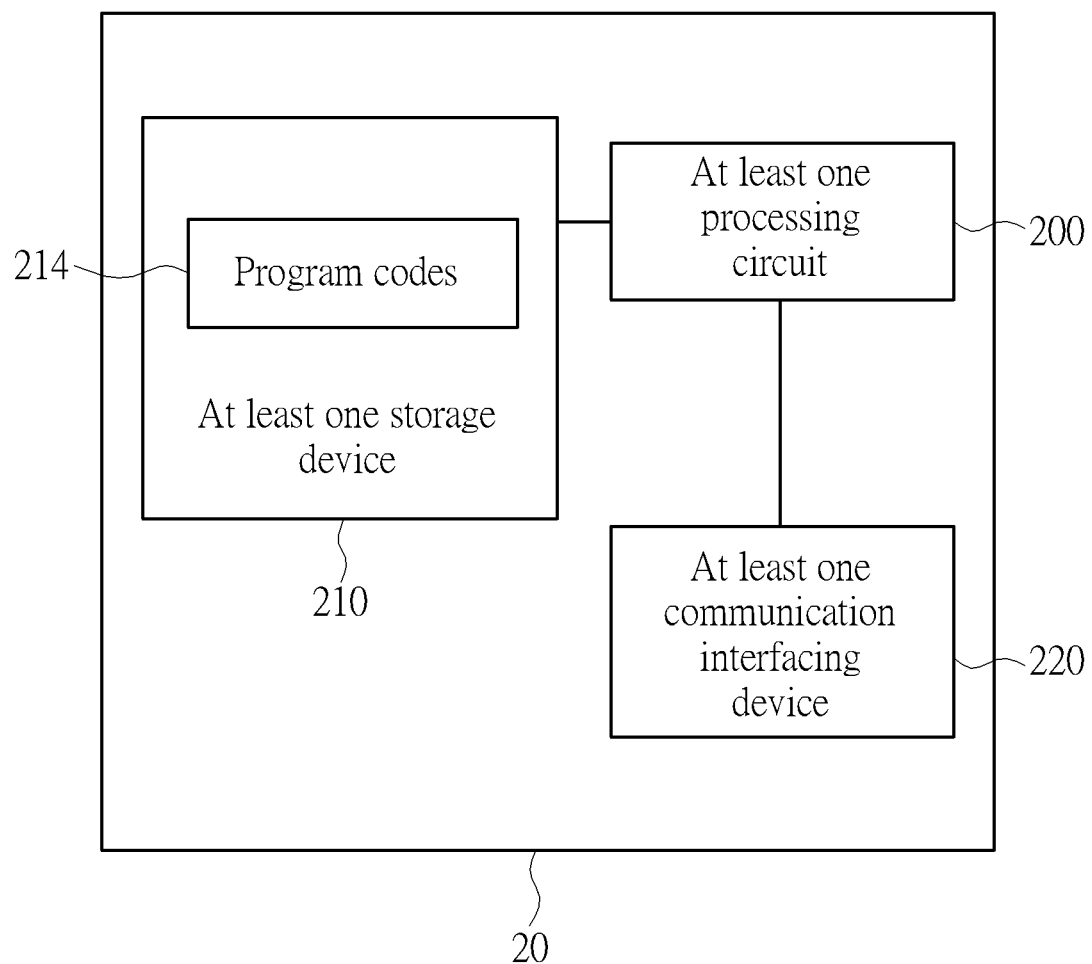
FIG. 2 is a schematic diagram of a communication device according to an example of the present invention.

FIG. 2 is a schematic diagram of a communication device 20 according to an example of the present invention. The communication device 20 may be a communication device or the network shown in FIG. 1, but is not limited herein. The communication device 20 may include at least one processing circuit 200 such as a microprocessor or Application Specific Integrated Circuit (ASIC), at least one storage device 210 and at least one communication interfacing device 220. The at least one storage device 210 may be any data storage device that may store program codes 214, accessed and executed by the at least one processing circuit 200. Examples of the at least one storage device 210 include but are not limited to a subscriber identity module (SIM), read-only memory (ROM), flash memory, random-access memory (RAM), Compact Disc Read-Only Memory (CD-ROM), digital versatile disc-ROM (DVD-ROM), Blu-ray Disc-ROM (BD-ROM), magnetic tape, hard disk, optical data storage device, non-volatile storage device, non-transitory computer-readable medium (e.g., tangible media), etc. The at least one communication interfacing device 220 is preferably at least one transceiver and is used to transmit and receive signals (e.g., data, messages and/or packets) according to processing results of the at least one processing circuit 200.

Figure 3:
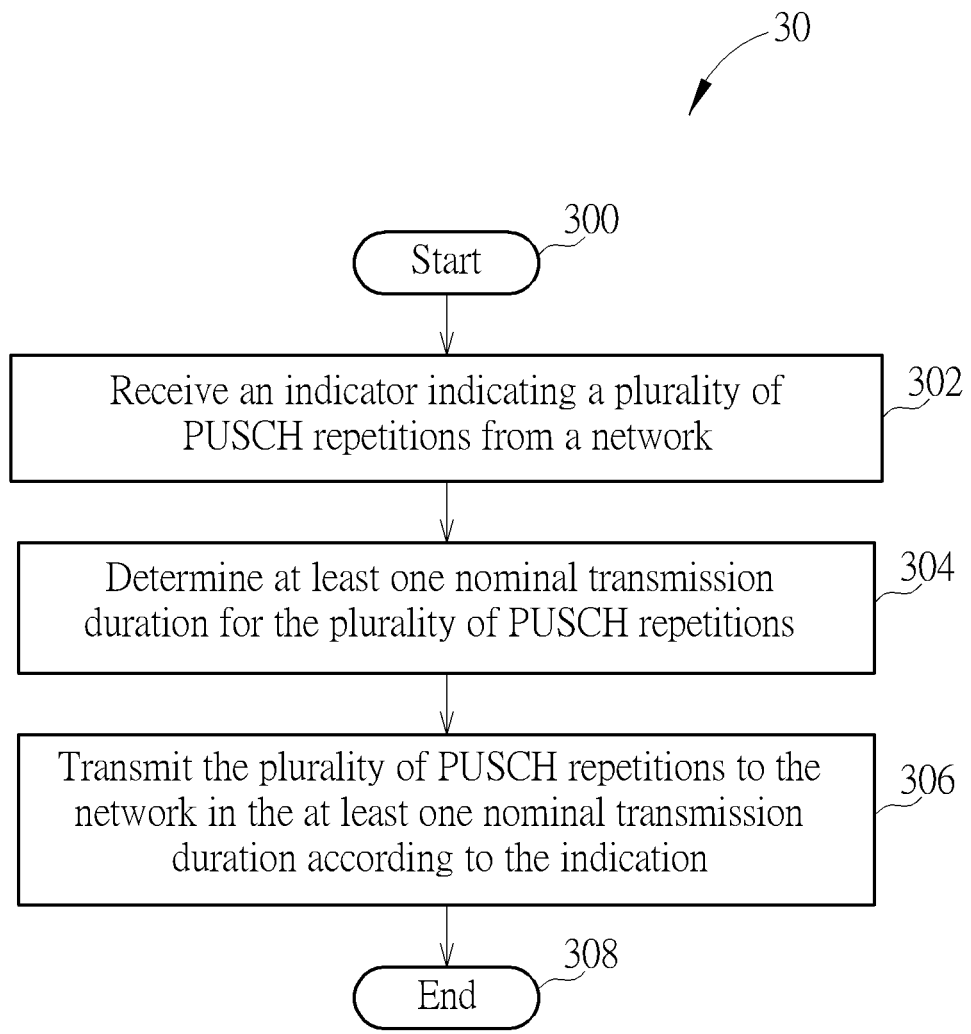
FIG. 3 is a flowchart of a process according to an example of the present invention.

FIG. 3 is a flowchart of a process 30 according to an example of the present invention. The process 30 may be utilized in a communication device, to handle physical UL shared channel (PUSCH) transmissions. The process 30 may be compiled into the program codes 214 and includes the following steps:

Step 300: Start.

Step 302: Receive an indicator indicating a plurality of PUSCH repetitions from a network.

Step 304: Determine at least one nominal transmission duration for the plurality of PUSCH repetitions.

Step 306: Transmit the plurality of PUSCH repetitions to the network in the at least one nominal transmission duration according to the indication.

Step 308: End.

According to the process 30, the communication device receives an indicator indicating a plurality of PUSCH repetitions from a network. The communication device determines at least one nominal transmission duration for the plurality of PUSCH repetitions. Then, the communication device transmits the plurality of PUSCH repetitions to the network in the at least one nominal transmission duration according to the indication. That is, the at least one nominal transmission duration is determined to provide a new time duration for transmitting the PUSCH repetitions. Thus, the PUSCH repetitions may be received correctly by the network.

Realization of the process 30 is not limited to the above description. The following examples maybe applied for realizing the process 30.

In one example, the plurality of PUSCH repetitions belong to a single layer transmission. In one example, the plurality of PUSCH repetitions are a transport block (TB) over a plurality of slots (e.g., time slots). In one example, the plurality of PUSCH repetitions are in different slots. In one example, at least two repetitions (e.g., 2, 3, 4, . . . , etc.) of the plurality of PUSCH repetitions are in a same slot.

In one example, the communication device further transmits a capability related to the determination of the at least one nominal transmission duration to the network. For example, the capability may include a maximum time gap between two UL transmissions (e.g., PUSCHs), a maximum total time gap among all UL transmissions (e.g., PUSCHs) in a nominal transmission duration, a total number of time gaps in a nominal transmission duration, and/or a modulation order for the UL transmissions. Thus, fewer DMRSs are needed for performing channel estimation for a UL transmission (e.g., a PUSCH), when the communication device is indicated to perform the UL transmission in a nominal transmission duration. In one example, the number of DMRSs in the nominal transmission duration may be determined according to a modulation order of the UL transmission. In one example, a position of a DMRS in the nominal transmission duration may be a fixed position, or may be determined according to an indication (e.g., a UL grant or a higher layer configuration) transmitted by the network. In one example, the capability comprises a maximum duration during which power consistency and phase continuity are maintained by the communication device such that the communication device can support DMRS bundling for a PUSCH and/or a physical UL control channel (PUCCH).

In one example, a length of one of the at least one nominal transmission duration is determined according to a higher layer configuration, and the one of the at least one nominal transmission duration comprises a plurality of consecutive slots. In one example, a minimum of the length of the one of the at least one nominal transmission duration is 2 slots.

In one example, a length of a last nominal transmission duration of the at least one nominal transmission duration is determined by the communication device (or the network). In one example, the at least one nominal transmission duration is configured for at least one bandwidth part (BWP), e.g., respectively.

In one example, a start of a beginning nominal transmission duration of the at least one nominal transmission duration is a beginning slot of a beginning PUSCH repetition of the plurality of PUSCH repetitions. In one example, an end of a last nominal transmission duration of the at least one nominal transmission duration is a last symbol of a last PUSCH repetition of the plurality of PUSCH repetitions.

In one example, one of the at least one nominal transmission duration comprises at least one of an actual transmission duration and an event. The actual transmission duration may include one or more DMRSs. In one example, a start of the actual transmission duration is a beginning symbol of a beginning PUSCH repetition of the plurality of PUSCH repetitions in the one of the at least one nominal transmission duration. In one example, an end of the actual transmission duration is a last symbol of a last PUSCH repetition of the plurality of PUSCH repetitions before the event. In one example, a start of the actual transmission duration is a beginning symbol of a beginning PUSCH repetition of the plurality of PUSCH repetitions after the event. In one example, an end of the actual transmission duration is a last symbol of a last PUSCH repetition of the plurality of PUSCH repetitions. Thus, multiple time durations are used for performing the PUSCH repetitions.

In one example, the event causes at least one of power consistency and phase continuity not to be maintained across two PUSCH repetitions of the plurality of PUSCH repetitions (e.g., before and after the event). In one example, the event comprises that a length of a gap between the two PUSCH repetitions is greater than a threshold value. In one example, there is no actual transmission duration after the event. That is, the communication device may not resume PUSCH repetition(s) after the event. In one example, the event comprises a cancellation of one of the plurality of PUSCH repetitions, e.g., by the communication device or the network. In one example, the cancellation is determined according to a DL control information (DCI) transmitted by the network. In one example, the cancellation is caused by different transmission directions, e.g., a collision of a UL transmission and a DL reception. The communication device may transmit at least one DBMS in an actual transmission duration after the event, since the power consistency and the phase continuity cannot be maintained.

In one example, the indicator is obtained according to a DCI transmitted by the network. In one example, the indicator is obtained according to a configured grant configuration transmitted by the network.

If the communication device is capable of maintaining power consistency and phase continuity in a time duration, the communication device can transmit more PUSCHs while transmitting less DMRSs (e.g., the number of DMRSs is smaller than the number of PUSCHs). Resource saved from not transmitting the DMRSs can be used for transmitting the PUSCHs to improve the transmission efficiency of the PUSCHs. Correspondingly, the network can perform advanced receiving technique(s) (e.g., joint channel estimation) in the time duration to receive the PUSCHs by using less DMRSs. The communication device may not maintain the power consistency and the phase continuity in the time duration, if an event happens in the time duration. The event may include at least one of the following situation(s): a modulation order is changed, a resource block (RB) allocation in terms of a length of a RB and a frequency position of the RB is changed, a transmission power level of a serving cell of the network of the communication device is changed, a UL beam switching for the communication device (e.g., frequency range 2 (FR2) UE) occurs, there are more than X un-scheduled orthogonal frequency division multiplexing (OFDM) symbols in-between a PUSCH reception or a PUCCH repetition and a DL reception in-between a PUSCH reception or a PUCCH repetition occurs.

Figure 4:
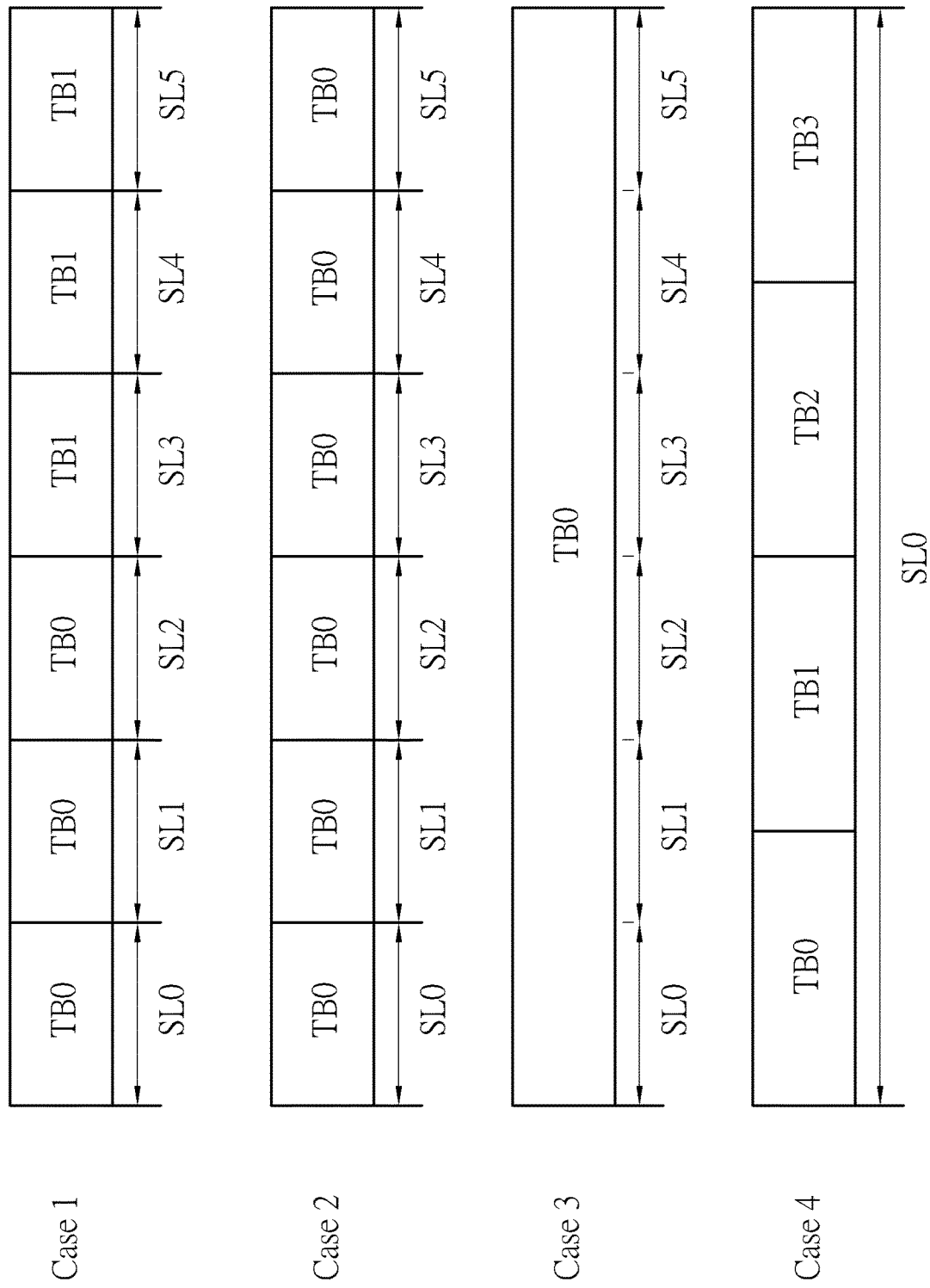
FIG. 4 is a schematic diagram of TBs according to an example of the present invention.

FIG. 4 is a schematic diagram of TBs according to an example of the present invention. Two cases are considered in FIG. 4. In Case 1, two TBs TB0 and TB1 are transmitted or scheduled in slots SL0-SL5. The TB TB0 is transmitted in the slots SL0-SL2, and the TB TB1 is transmitted in the slots SL3-SL5. A length of a TB is the same as a length of a slot. In Case 2, the TB0 and the TB1 are the same TB. That is, the TBs TB0 is transmitted or scheduled in the slots SL0-SL5. A length of a TB is the same as a length of a slot. In Case 3, the TB TB0 is transmitted or scheduled in the slots SL0-SL5. A length of a TB is the same as a length of 5 slots. In Case 4, four TBs TB0-TB3 are transmitted or scheduled in the slot 0. In one example, the TBs TB0-TB3 are the same TB. In one example, a length of a slot is the same or not smaller than a length of 4 TBs. Note that in the above cases, the TB(s) is transmitted in PUSCH(s).

Figure 5:
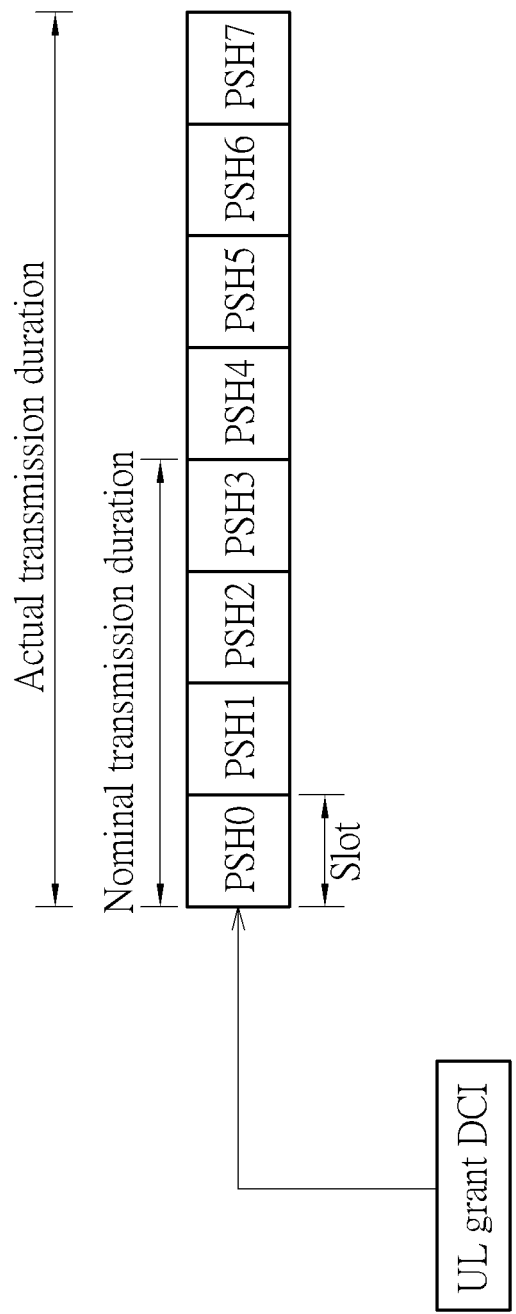
FIG. 5 is a schematic diagram of transmissions of PUSCH repetitions according to an example of the present invention.

FIG. 5 is a schematic diagram of transmissions of PUSCH repetitions according to an example of the present invention. An actual transmission duration includes 8 PUSCH repetitions PSH0-PSH7 in the present example. A length of a PUSCH repetition is the same as a length of a slot. A nominal transmission duration includes 4 PUSCH repetitions. Thus, the actual transmission duration includes two nominal transmission durations in the present example. That is, multiple time durations are provided for the communication device to transmit the PUSCH repetitions PSH0-PSH7. A length of the nominal transmission duration may be determined according to at least one of a higher layer signal (e.g., radio resource control (RRC) signal and/or medium access control (MAC) signal), a physical layer signal (e.g., DCI), a modulation order (e.g., binary phase-shift keying (BPSK), quadrature phase-shift keying (QPSK) or 16 quadrature amplitude modulation (16-QAM)), a sub-carrier spacing, etc. The communication device may receive a UL grant DCI which indicates resources for transmitting the PUSCH repetitions PSH0-PSH7 and indicates a length of the nominal transmission duration, i.e., 4 slots.

Figure 6:
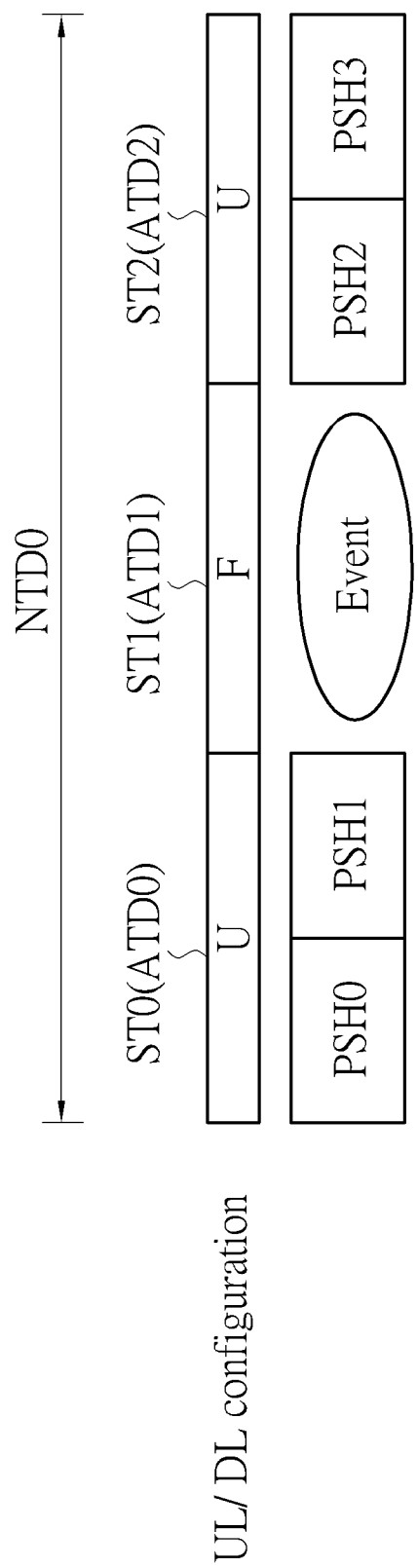
FIG. 6 is a schematic diagram of transmissions of PUSCH repetitions according to an example of the present invention.

FIG. 6 is a schematic diagram of transmissions of PUSCH repetitions according to an example of the present invention. The communication device may be configured with a UL/DL configuration, which indicates transmission directions of slots. In FIG. 6, a nominal transmission duration NTD0 includes 3 slots ST0-ST2 which are a UL slot, a flexible slot and a UL slot, respectively. The slot ST0 includes PUSCH repetitions PSH0 and PSH1. The slot ST1 includes an event, and PUSCH repetitions in the slot ST1 are omitted (e.g., dropped or cancelled). The slot ST2 includes PUSCH repetitions PSH2 and PSH3. The slots ST0 and ST2 may be seem as actual transmission durations ATD0 and ATD1 where the PUSCH repetitions PSH0-PSH3 are actually transmitted. Thus, a nominal transmission duration includes two actual transmission durations in the present example.

A start of the actual transmission duration ATD0 is a beginning symbol of the PUSCH repetition PSH0 (i.e., the beginning PUSCH repetition in the actual transmission duration ATD0). The actual transmission duration ATD0 may include at least one DMRS, e.g., the beginning symbol of the PUSCH repetition PSCH0. An end of the actual transmission duration ATD0 is a last symbol of the PUSCH repetition PSH1 (i.e., the last PUSCH repetition before the event). The examples of the event can be referred to the previous description, and is not narrated herein.

A start of the actual transmission duration ATD2 is a beginning symbol of the PUSCH repetition PSH2 (i.e., the beginning PUSCH repetition after the event). The actual transmission duration ATD2 may include at least one DMRS, e.g., the beginning symbol of the PUSCH repetition PSCH2. That is, the at least one DMRS for the related PSCH is transmitted immediately after the event. An end of the actual transmission duration ATD2 is a last symbol of the PUSCH repetition PSH3 (i.e., the last PUSCH repetition).

In one example, if a length of the event is shorter than a value (e.g., X symbols), the communication device may not transmit any DMRS in the actual transmission duration ATD2, e.g., because the power consistency and the phase continuity are not changed greatly.

In one example, if the length of the event is greater than a first value (e.g., X symbols) and a length of the actual transmission duration ATD2 is shorter than a second value (e.g., Y symbols or Y repetitions), the communication device may not transmit any PUSCH repetition in the actual transmission duration ATD2.

In one example, if the length of the event is greater than a first value (e.g., X symbols) and a length of the actual transmission duration ATD2 is greater than a second value (e.g., Y symbols or Y repetitions), the communication device may transmit at least one PUSCH repetition in the actual transmission duration ATD2.

The operation of "determine" described above may be replaced by the operation of "compute", "calculate", "obtain", "generate", "output", "use", "choose/select", "decide" or "is configured to". The operation of "detect" described above may be replaced by the operation of "monitor", "receive", "sense" or "obtain". The phrase of "according to" described above may be replaced by "in response to". The phrase of "associated with" described above may be replaced by "of" or "corresponding to". The term of "via" described above may be replaced by "on", "in" or "at".

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means maybe the communication device 20.

Examples of the hardware may include analog circuit(s), digital circuit(s) and/or mixed circuit(s). For example, the hardware may include ASIC(s), field programmable gate array(s) (FPGA(s)), programmable logic device(s), coupled hardware components or combination thereof. In another example, the hardware may include general-purpose processor(s), microprocessor(s), controller(s), digital signal processor(s) (DSP(s)) or combination thereof.

Examples of the software may include set(s) of codes, set(s) of instructions and/or set(s) of functions retained (e.g., stored) in a storage unit, e.g., a computer-readable medium. The computer-readable medium may include SIM, ROM, flash memory, RAM, CD-ROM/DVD-ROM/BD-ROM, magnetic tape, hard disk, optical data storage device, non-volatile storage unit, or combination thereof. The computer-readable medium (e.g., storage unit) may be coupled to at least one processor internally (e.g., integrated) or externally (e.g., separated). The at least one processor which may include one or more modules may (e.g., be configured to) execute the software in the computer-readable medium. The set(s) of codes, the set(s) of instructions and/or the set(s) of functions may cause the at least one processor, the module(s), the hardware and/or the electronic system to perform the related steps.

Examples of the electronic system may include a system on chip (SoC), system in package (SiP), a computer on module (CoM), a computer program product, an apparatus, a mobile phone, a laptop, a tablet computer, an electronic book or a portable computer system, and the communication device 20.

To sum up, the present invention provides a communication device for handling PUSCH transmissions. Multiple time durations are proposed to provide a new architecture for the PUSCH transmissions. Thus, the efficiency of the PUSCH transmissions is improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device for handling physical uplink (UL) shared channel (PUSCH) transmissions, comprising:
at least one storage device; and
at least one processing circuit, coupled to the at least one storage device, wherein the at least one storage device stores instructions, and the at least one processing circuit is configured to execute the instructions of:
receiving an indicator indicating a plurality of physical uplink (UL) shared channel (PUSCH) repetitions from a network;
determining at least one nominal transmission duration for the plurality of PUSCH repetitions; and
transmitting the plurality of PUSCH repetitions to the network in the at least one nominal transmission duration according to the indication;
wherein one of the at least one nominal transmission duration comprises at least one of an actual transmission duration and an event;
wherein the event causes at least one of power consistency and phase continuity not to be maintained across two PUSCH repetitions of the plurality of PUSCH repetitions before and after the event;
wherein the event comprises that a length of a gap between the two PUSCH repetitions is greater than a threshold value.

2. The communication device of claim 1, wherein the plurality of PUSCH repetitions belong to a single layer transmission.

3. The communication device of claim 1, wherein the plurality of PUSCH repetitions are a transport block (TB) over a plurality of slots.

4. The communication device of claim 1, wherein the plurality of PUSCH repetitions are in different slots.

5. The communication device of claim 1, wherein at least two repetitions of the plurality of PUSCH repetitions are in a same slot.

6. The communication device of claim 1, wherein the instructions further comprise:
transmitting a capability related to the determination of the at least one nominal transmission duration to the network.

7. The communication device of claim 6, wherein the capability comprises a maximum duration during which power consistency and phase continuity are maintained by the communication device.

8. The communication device of claim 1, wherein a length of one of the at least one nominal transmission duration is determined according to a higher layer configuration, and the one of the at least one nominal transmission duration comprises a plurality of consecutive slots.

9. The communication device of claim 8, wherein a minimum of the length of the one of the at least one nominal transmission duration is 2.

10. The communication device of claim 1, wherein a length of a last nominal transmission duration of the at least one nominal transmission duration is determined by the communication device.

11. The communication device of claim 1, wherein the at least one nominal transmission duration is configured for at least one bandwidth part (BWP).

12. The communication device of claim 1, wherein a start of a beginning nominal transmission duration of the at least one nominal transmission duration is a beginning symbol of a beginning PUSCH repetition of the plurality of PUSCH repetitions.

13. The communication device of claim 1, wherein an end of a last nominal transmission duration of the at least one nominal transmission duration is a last symbol of a last PUSCH repetition of the plurality of PUSCH repetitions.

14. The communication device of claim 1, wherein a start of the actual transmission duration is a beginning symbol of a beginning PUSCH repetition of the plurality of PUSCH repetitions in the one of the at least one period.

15. The communication device of claim 1, wherein an end of the actual transmission duration is a last symbol of a last PUSCH repetition of the plurality of PUSCH repetitions before the event.

16. The communication device of claim 1, wherein a start of the actual transmission duration is a beginning symbol of a beginning PUSCH repetition of the plurality of PUSCH repetitions after the event.

17. The communication device of claim 1, wherein an end of the actual transmission duration is a last symbol of a last PUSCH repetition of the plurality of PUSCH repetitions.

18. The communication device of claim 1, wherein there is no actual transmission duration after the event.

19. The communication device of claim 1, wherein the event comprises a cancellation of one of the plurality of PUSCH repetitions.

20. The communication device of claim 19, wherein the cancellation is determined according to a downlink (DL) control information (DCI) transmitted by the network.

21. The communication device of claim 1, wherein the indicator is obtained according to a DCI transmitted by the network.

22. The communication device of claim 1, wherein the indicator is obtained according to a configured grant configuration transmitted by the network.

* * * * *